G. Y. Harner,
Brick Machine.
Nº 439.    Patented Oct. 23, 1837.
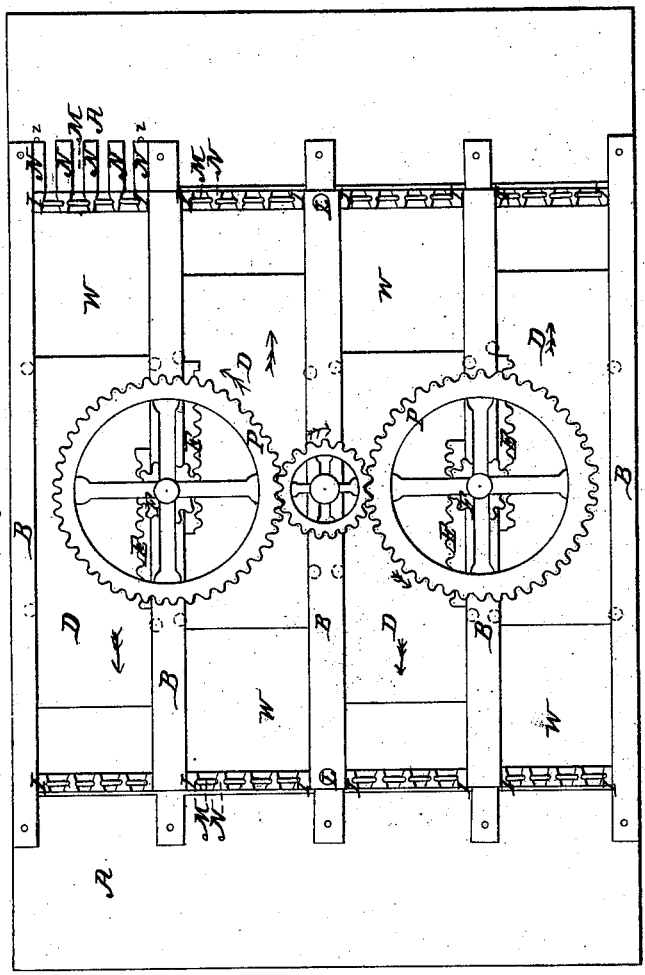
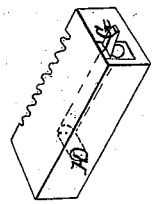
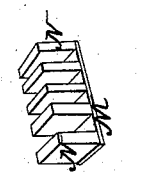
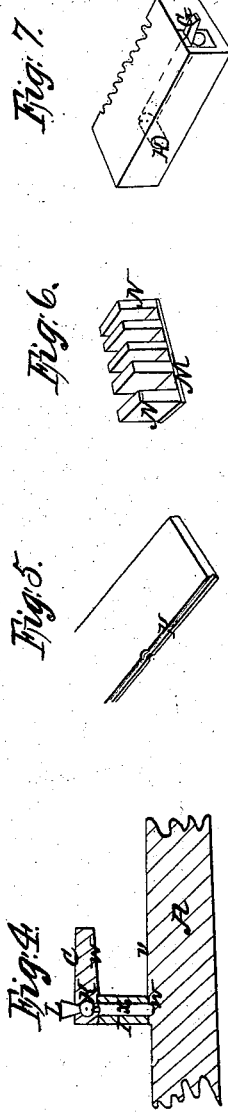

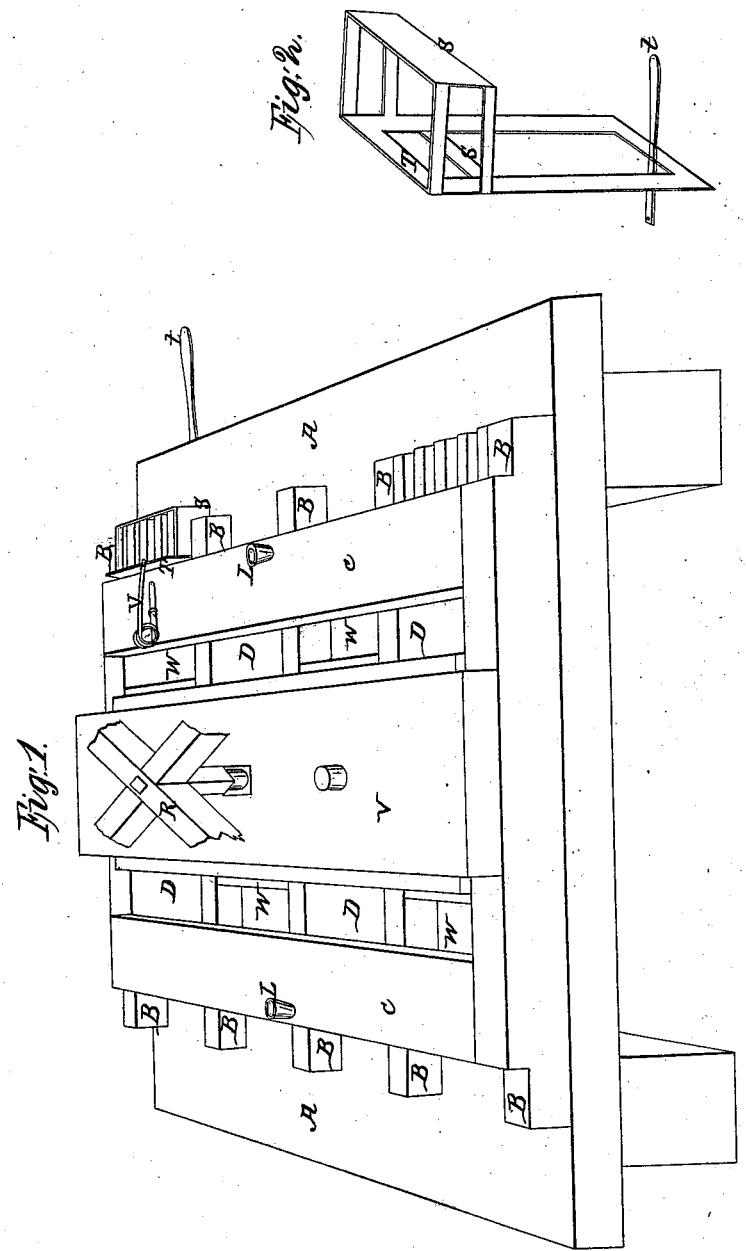

UNITED STATES PATENT OFFICE.

GAYLORD V. HARPER, OF FRANKLINVILLE, NEW YORK.

MACHINE FOR MAKING BRICKS.

Specification of Letters Patent No. 439, dated October 23, 1837.

*To all whom it may concern:*

Be it known that I, GAYLORD V. HARPER, of Franklinville, in the county of Cattaraugus and State of New York, have invented a new and useful Improvement in Machines, for Making Bricks, called "Harper's Improved Brick Machine," which is described as follows, reference being had to the annexed drawings of the same, making part of this specification.

For a double machine I make a platform A about eight feet in length, five feet in width and of any required thickness. On this platform I fasten five pieces of scantling B, each six and a half inches in depth and three inches in width, placed parallel to each other as far apart as the width of the piston hereafter described. Over these and near each end I frame a plank, C C, sixteen inches in width and in length equal to the width of the platform and of requisite thickness to give it proper strength.

I make four pistons D D D D, each as wide as the space between every pair of scantlings, and between which they are placed against anti-friction rollers represented by dotted lines at *r* at the sides—said pistons being four feet, six inches in length and about four inches in depth. On the side of each piston is fastened a rack E, into which a cog wheel F works for moving the same; and into the end is bored longitudinally an aperture covered at the mouth by a swinging valve, G, opening outward, or toward the clay, for preventing it adhering to the piston on its return;—said aperture being intersected by a cross aperture H from one side of the piston to admit air. See Figure 7.

I make forty eight bars I each six inches in length, four in width on the outside or toward the molds and half an inch in thickness beveled on the side toward the piston *s* and placed parallel and vertical as far apart as the thickness of the brick or tile to be molded and let into the before mentioned plank above and the platform below, far enough to give them the required strength, either by dovetailed mortise and tenon, or in any other suitable manner. The plank and platform are also to be beveled, the former on the under side *u* and the latter on the upper side, *v*. I cut a horizontal groove K in the plank an eighth of an inch deep intersected by a vertical aperture from the top in which is placed a funnel L for supplying it with water to moisten the clay and keep the bars always wet. The platform is also channeled as at *w*. I likewise form channels on the sides of the vertical bars to communicate with the horizontal groove before mentioned for conveying the water to the clay and sides of the bars as seen at *x*.

I make my molds with a horizontal plate, M, upon which I raise vertical leaves N in proportion to the required number of bricks to be molded, which I place as far apart as the size of the intended brick or tile.

I have two horizontal cog wheels, F F, about ten inches in diameter placed on vertical shafts working into the racks on the pistons. On these shafts I have two other cog wheels P P each about thirty inches in diameter, between which and working into them is placed a small cog wheel Q of about ten inches in diameter on a vertical shaft extending above the frame about three feet, having on its upper end a sweep, R, for the horse to draw by.

I make use of two knives S S for cutting the clay into proper lengths for bricks or tiles, one working between the molds and bars and the other on the outer side of the molds, both attached to a sliding frame T, moved downward by a treadle *t* by the foot of one of the attendants and raised by a spring U when the foot is removed.

I raise the platform to any desired height for operating the machine by placing four or more pieces of timber under it.

I frame other planks V on top of sufficient size and strength for the gudgeons of the vertical shafts.

I form hoppers W W between the planks to receive the clay.

To make a single machine containing only two pistons I take off the two 30 inch wheels and the small wheel between them and place the horse on the line between the two pistons. In working the machine, the horse will travel far enough to carry the clay through between the bars to make the length of a brick. He then travels the contrary way the same distance, which reverses the motion of the pistons.

The method of using the machine is as follows: I first prepare the clay by grinding it in a common mixing tub and then put it into the hoppers of the brick machine by means of wheel barrows or shovels. I cause the horse or horses to move around with the sweep about two thirds of the circle in which he walks—this carries out two of the pistons and recedes two; those thus advanced force the clay between the bars in a condensed state into the molds. The knives are then brought down by the attendant bearing his foot on a treadle, which also contracts the spring to which they are attached—the cut being made, the brick or tile is formed in the molds—the foot is then raised when the spring again carries up the knives. The molds are then removed and discharged. The horse is then driven back which causes the other two pistons to perform a similar operation. Water is all the time passing through the channels for keeping the bars, plank and platform wet and the clay in a moist state. The molds are held in place while molding by pins or stops $z$ $z$.

What I claim as my invention and which I desire to secure by Letters Patent, is—

1. The combination and arrangement of the several parts of the before described machine for making bricks.

2. The channels in the plank and bars for conveying water to moisten the clay and keep the bars wet.

3. The valves and apertures in the pistons.

The principle of forcing the clay through a grating into the molds and cutting off the clay by a knife passing between the molds and the grating, is not claimed.

GAYLORD V. HARPER.

Witnesses:
LUTHER BROOKINS,
WILLIAM DRURY.